United States Patent
Cobb, Jr. et al.

(10) Patent No.: US 11,875,915 B2
(45) Date of Patent: *Jan. 16, 2024

(54) HIGH STRENGTH DIELECTRIC MEMBER FOR A COMMUNICATIONS CABLE

(71) Applicant: CommScope Technologies LLC, Hickory, NC (US)

(72) Inventors: Ted Q. Cobb, Jr., Hickory, NC (US); Trent M. Hayes, Hickory, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,454

(22) Filed: Jan. 16, 2023

(65) Prior Publication Data

US 2023/0170110 A1 Jun. 1, 2023

Related U.S. Application Data

(63) Continuation of application No. 17/156,571, filed on Jan. 23, 2021, now Pat. No. 11,587,700, which is a continuation of application No. PCT/US2019/040022, filed on Jun. 29, 2019.

(Continued)

(51) Int. Cl.
*H01B 11/08* (2006.01)
*H01B 7/18* (2006.01)
(Continued)

(52) U.S. Cl.
CPC .............. *H01B 11/08* (2013.01); *H01B 7/181* (2013.01); *H01B 7/295* (2013.01); *H01B 13/14* (2013.01)

(58) Field of Classification Search
CPC . H01B 1/02; H01B 1/22; H01B 3/004; H01B 3/08; H01B 3/48; H01B 7/02;
(Continued)

(56) References Cited

U.S. PATENT DOCUMENTS 4,698,379 A * 10/1987 Nakaya .................. B82Y 30/00
524/436
5,087,110 A 2/1992 Inagaki et al.
(Continued)

FOREIGN PATENT DOCUMENTS

GB 2187460 A 9/1987

*Primary Examiner* — William H. Mayo, III
(74) *Attorney, Agent, or Firm* — Muncy, Geissler, Olds & Lowe, P.C.

(57) ABSTRACT

A new dielectric material for a communication cable has a dielectric base with strength members embedded therein. By a new process, vacuum voids are formed in the dielectric base and at least partially contain or abut the strength members. The material is particularly well suited for a first dielectric tape, where the cable includes a first insulated conductor, the first dielectric tape and a second insulated conductor, with the first insulated conductor being twisted with the second insulated conductor with the first dielectric tape residing between the first insulated conductor and the second insulated conductor. The material is also suitable for a separator of the cable serving to separate twisted pairs from each other within the cable, as well as other components of the cable, such as an insulation layer of one or more of the insulated conductors of the twisted pairs.

20 Claims, 18 Drawing Sheets

Related U.S. Application Data

(60) Provisional application No. 62/712,939, filed on Jul. 31, 2018.

(51) Int. Cl.
  *H01B 7/295* (2006.01)
  *H01B 13/14* (2006.01)

(58) Field of Classification Search
  CPC .... H01B 7/0216; H01B 7/295; H01B 11/002; H01B 11/04; H01B 13/329; H01B 7/00
  USPC .............. 174/110 R–110 E, 111, 112, 113 R, 174/113 AS, 113 C, 116, 120 R, 120 SR, 174/121 R, 121 A, 122 R, 122 G
  See application file for complete search history.

(56) References Cited

U.S. PATENT DOCUMENTS

| | | | |
|---|---|---|---|
| 5,286,924 A * | 2/1994 | Loder | H01B 7/0233 174/117 F |
| 6,222,130 B1 | 4/2001 | Gareis et al. | |
| 6,506,976 B1 | 1/2003 | Neveux, Jr. | |
| 7,999,184 B2 * | 8/2011 | Wiebelhaus | H01B 11/06 174/113 C |
| 8,798,419 B2 | 8/2014 | Wessels, Jr. et al. | |
| 9,076,568 B2 | 7/2015 | Wessels, Jr. et al. | |
| 9,316,801 B1 | 4/2016 | Kithuka | |
| 9,418,775 B2 | 8/2016 | Wessels, Jr. et al. | |
| 10,714,232 B1 * | 7/2020 | Gebs | H01B 7/17 |
| 2006/0096777 A1 * | 5/2006 | Glew | H01B 11/04 174/113 C |
| 2009/0133895 A1 * | 5/2009 | Allen | H01B 7/2825 29/745 |
| 2009/0289212 A1 | 11/2009 | Schroeer | |
| 2013/0014972 A1 | 1/2013 | Wessels, Jr. et al. | |
| 2013/0161063 A1 | 6/2013 | Gould et al. | |
| 2014/0262427 A1 | 9/2014 | Brown et al. | |
| 2015/0129277 A1 | 5/2015 | Srinivas et al. | |
| 2015/0357095 A1 * | 12/2015 | Siripurapu | H01B 7/295 174/99 R |
| 2016/0133355 A1 * | 5/2016 | Glew | H01B 1/22 248/49 |
| 2017/0023756 A1 * | 1/2017 | Glew | H01B 1/02 |
| 2017/0154710 A1 * | 6/2017 | Cobb, Jr. | H01B 11/002 |
| 2020/0152347 A1 * | 5/2020 | Zhang | C09D 151/06 |

* cited by examiner

HIGH STRENGTH DIELECTRIC MEMBER FOR A COMMUNICATIONS CABLE

This application is a continuation of application Ser. No. 17/156,571, filed Jan. 23, 2021, which is a continuation of International Application No. PCT/US2019/040022, filed Jun. 29, 2019, which claims the benefit of U.S. Provisional Application No. 62/712,939, filed Jul. 31, 2018, all of which are herein incorporated by reference.

BACKGROUND OF THE INVENTION

1. Field of the Invention

The present invention relates to a communications cable, such as a twisted pair cable for a local area network (LAN), containing a dielectric member. More particularly, the present invention relates to an improved structure for, and method of making, a dielectric member of a cable, such as a high strength dielectric tape, which may be located between first and second insulated conductors of a twisted pair and/or a high strength separator/tape, which may separate at least a first twisted pair from at least a second twisted pair.

2. Description of the Related Art

It is known in the background art to incorporate a dielectric member within a communications cable. Examples of such uses are a tape separator in a twisted pair cable. In a typical LAN cable with four twisted pairs, the tape separator separates two of the twisted pairs from the other two twisted pairs and assists in reducing internal crosstalk. Another type of dielectric member would be a plus-shaped or star-shaped separator. In a typical LAN cable with four twisted pairs, the plus-shaped or star-shaped separator separates each twisted pair from the other twisted pairs and again assists in reducing internal crosstalk.

Small dielectric tapes can also be used to space insulated conductors forming a twisted pair. As illustrated in FIG. 1 of the Assignee's prior U.S. Pat. No. 6,506,976, a LAN cable 1 has a jacket J surrounding first through fourth twisted pairs A, B, C, D which are spaced from each other by a plus-shaped separator 3. Each of the twisted pairs A, B, C, D includes a first insulated conductor 5, a dielectric tape 7, and a second insulated conductor 9, wherein the first insulated conductor 5 is twisted with the second insulated conductor 9 with the dielectric tape 7 residing between the first insulated conductor 5 and the second insulated conductor 9.

Related prior art can also be found in the following U.S. Pat. Nos. 5,087,110; 6,222,130; 7,999,184; 8,798,419; 9,076,568 and 9,418,775, and the following U.S. Published Applications 2013/0014972; 2013/0161063; 2014/0262427 and 2015/0129277, with all of the above listed U.S. Patents and U.S. Published Applications being herein incorporated by reference.

SUMMARY OF THE INVENTION

Although the dielectric members of the cables of the background art perform well, Applicants have appreciated some drawbacks. There is a demand for increased throughput in production facilities. This translates into increasing manufacturing speeds. As the manufacturing speed is increased, the tension on the cable components is increased to accurately control the positioning of the components as they are brought together for the jacketing operation. In the case of a twisted pair cable, increasing the manufacturing speed puts increased stress on all components in the twisted-pair communications cable, such as the dielectric tape between insulated conductors and/or the dielectric separator/tape between twisted pairs.

While increasing the manufacturing speed, the inventors noticed that the dielectric tape breaks first. When the dielectric tape breaks, the reel supplying the dielectric tape to the cable forming section stops rotating. This lack of rotation is sensed by the manufacturing equipment and the manufacturing process immediately shuts down. The partially produced cable length must be recycled and the manufacturing equipment must be cleared and reset to a slower speed before another cable can be manufactured. Hence, the dielectric tape is the bottleneck to increasing the manufacturing speed of the cable.

As a first attempt at improving the strength of the tape, the inventors embedded strength members into the tapes. The strength members were minerals like aluminum tri-hydrate (ATH) and talc. The strength members did improve the strength of the tapes. However, as cable manufacturing speeds were increased, the tapes were again the first component to fail by breakage. It is believed that the tensile forces applied to the tapes during high-speed cable manufacturing caused the tapes to elongate. The elongation may have resulted in instability in the feed rate at the point where the cable components are assembled, which resulted in a bind, which resulted in excessive tensile force being applied to the tape, and the breakage of the tape.

As a first step to addressing the problem, the inventors tested the tensile strength of the dielectric tape with embedded strength members by clamping one end of the tape to a stationary object and applying a pulling force to the other end of the tape until the tape broke. The inventors discovered that the tape could withstand a force of about two to four pounds with no noticeable change in length. After about two to four pounds of pressure the tape would start to yield, e.g., stretch, elongate, and become thinner. The tape continued to yield until it broke. However, it was observed that it required more and more tensile force to cause the tape to yield up to its point of breakage. In other words, the tensile strength of the tape ramped up and increased dramatically as the tape stretched. For example, a tape exposed to fixed seven pounds of pull force would elongate to a given extent and then would stop yielding and would be able to hold the seven pounds of force for an extended period of time without further elongation. Experimentally, it was discovered that a tape would continue to elongate to given extent and then sustain its integrity up to about fifteen pounds of force. Exceeding fifteen pounds of force caused the tape to break.

Noting this physical attribute of the tapes, the inventors had a tape with embedded strength members extruded and stretched the tape immediately after it was extruded, so as to elongate the tape. The tape was then cooled and loaded to a reel for use in manufacturing cable.

The idea was to pre-stretch the tape so that its tensile strength would be improved. In other words, if the tape starts yielding at two to four pounds, but only breaks at fifteen pounds. Perhaps, the tape could be pre-stretched by a force of about twelve pounds. In theory, the tape would then not further yield until a tensile force of more than twelve pounds is applied to it during the cable manufacturing process. As a result, the new tape would be in effect two, three or even six times stronger than the same tape which was not pre-stretched.

After pre-stretching the extruded tape and allowing the tape to cool, an unexpected result occurred. The tape prior to stretching would not float in water. The tape after stretching floated in water. Compared to the non-stretched tape the stretched tape was about 50% the weight per given unit volume. To discover why this phenomenon occurred, the inventors froze the tape and snapped the tape in half to inspect the interior of the tape. Under a microscope at powers up to 15,000×, it appeared that the presence of the strengthening materials in combination with the stretching action caused vacuum voids to form within the tape. As the tape cooled and stabilized and/or hardened, the vacuum voids remained within the dielectric material. These vacuum voids are very useful in the cabling arts.

Previously, foaming agents have been added to dielectric materials to cause gas bubbles to form throughout the dielectric material during the extrusion process. The gas bubbles lower the dielectric constant of the dielectric material, make the material lighter in weight, and reduce the amount of material available to burn, which also reduces smoke, etc. Therefore, foaming agents are very popular.

However, foaming agents add costs. Also, foaming agents must be well controlled during manufacturing, so that consistent gas bubbles are produced. In other words, the foaming agent is basically a chemical reaction and may be affected by temperature, humidity, barometric pressure, etc. If the chemical reaction is not reproduced consistently, variation in the foam percentages may occur, which can lead to undesired electrical performance imbalances and variations, like improper impedance and delay skew compensation. Also, foaming agents create "gas" bubbles, which by definition posses a gas of some sort. Gases do have a lower dielectric constant than the material used to form the dielectric tape, but a gas has a higher dielectric constant than a vacuum void. Also, gases burn and/or feed a fire. A vacuum void does not burn and does not feed a fire. Therefore, in addition to improving the strength of the tape, the stretching operation produced vacuum voids to lower the dielectric constant to the tape and lower the density of the tape.

Hence, the Applicant has invented a new dielectric member for a communications cable, such as a twisted pair cable, with new structural features. The objects of the new structural features are to enhance one or more performance and/or manufacturing characteristics of a dielectric member and the communication cable incorporating such a dielectric member. The primary benefits are enhancing one or more performance characteristics of a communication cable, like a lower dielectric constant of a cable element, and one of more mechanical characteristics of a communication cable, such as reducing weight, reducing cable diameter, reducing smoke emitted in the event of a fire, improving the strength attributes of the cable, enabling faster production of the cable, or enabling less costly production of the cable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
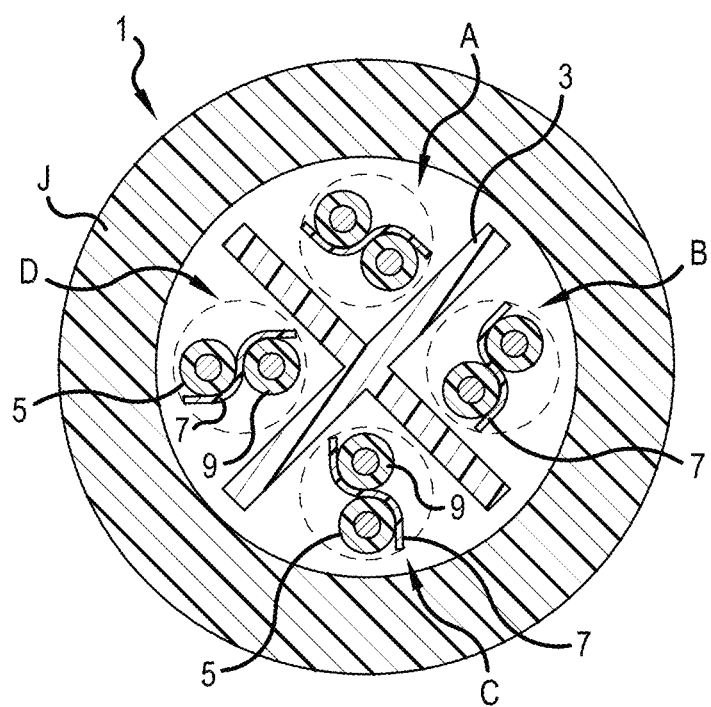
FIG. 1 is a cross sectional view of a twisted pair cable, in accordance with the background art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
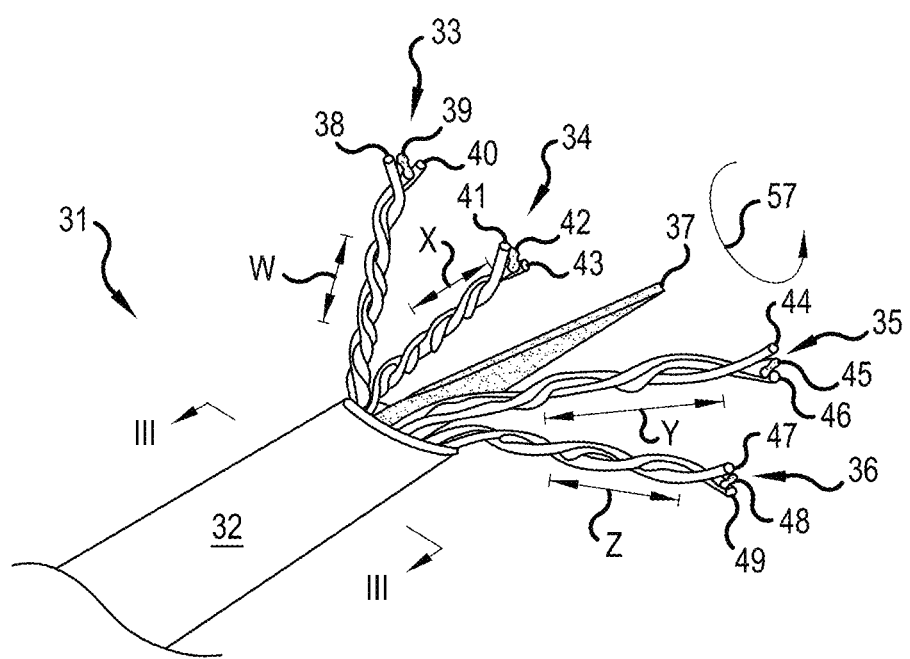
FIG. 2 is a perspective view of a twisted pair cable, in accordance with a first embodiment of the present invention.
Figure 3:
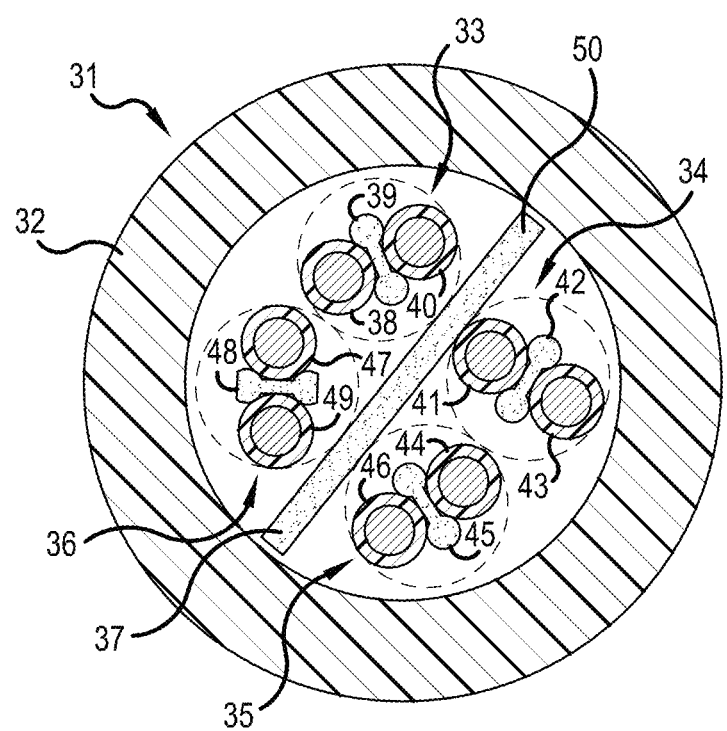
FIG. 3 is a cross sectional view of the twisted pair cable of FIG. 2 taken along line III-III.

FIG. 2 is a perspective view of a twisted pair cable 31, in accordance with a first embodiment of the present invention. FIG. 3 is a cross sectional view of the cable 31 taken along line III-III in FIG. 2. The cable 31 includes a jacket 32 formed around and surrounding first, second, third and fourth twisted pairs 33, 34, 35 and 36, respectively. The jacket 32 may be formed of polyvinylchloride (PVC), low smoke zero halogen PVC, polyethylene (PE), fluorinated ethylene propylene (FEP), polyvinylidene fluoride (PVDF), ethylene chlorotrifluoroethylene (ECTFE), or other foamed or solid materials common to the cabling art, or the inventive material described hereinafter.

A separator 37 within the jacket 32 resides between and separates the first and second twisted pairs 33 and 34 from the third and fourth twisted pairs 35 and 36. In FIGS. 2 and 3, the separator 37 is formed by a thin strip of dielectric material, having a thickness of about twenty mils or less, more preferably about eighteen mils or less, or about fifteen mils or less, such as about ten mils. However, other sizes and shapes of separators 37 may be employed in combination with the present invention, such as plus-shaped or star-shaped separators, sometimes referred to as a flute, isolator, or cross-web. The separator 37 may be formed of any material common to the cabling art, such as a polyolefin or fluoropolymer, like fluorinated ethylene propylene (FEP) or polyvinylchloride (PVC) or the inventive material described hereinafter.

As best seen in the cross sectional view of FIG. 3, the first twisted pair 33 includes a first insulated conductor 38, a first dielectric tape 39, and a second insulated conductor 40. The first insulated conductor 38 is twisted with the second insulated conductor 40, in a helical fashion having a twist length w, with the first dielectric tape 39 residing between the first insulated conductor 38 and the second insulated conductor 40.

The second twisted pair 34 includes a third insulated conductor 41, a second dielectric tape 42, and a fourth insulated conductor 43. The third insulated conductor 41 is twisted with the fourth insulated conductor 43, in a helical fashion having a twist length x, with the second dielectric tape 42 residing between the third insulated conductor 41 and the fourth insulated conductor 43.

The third twisted pair 35 includes a fifth insulated conductor 44, a third dielectric tape 45, and a sixth insulated conductor 46. The fifth insulated conductor 44 is twisted with the sixth insulated conductor 46, in a helical fashion having a twist length y, with the third dielectric tape 45 residing between the fifth insulated conductor 44 and the sixth insulated conductor 46.

The fourth twisted pair 36 includes a seventh insulated conductor 47, a fourth dielectric tape 48, and an eighth insulated conductor 49. The seventh insulated conductor 47 is twisted with the eighth insulated conductor 49, in a helical fashion having a twist length z, with the fourth dielectric tape 48 residing between the seventh insulated conductor 47 and the eighth insulated conductor 49.

Figure 4:
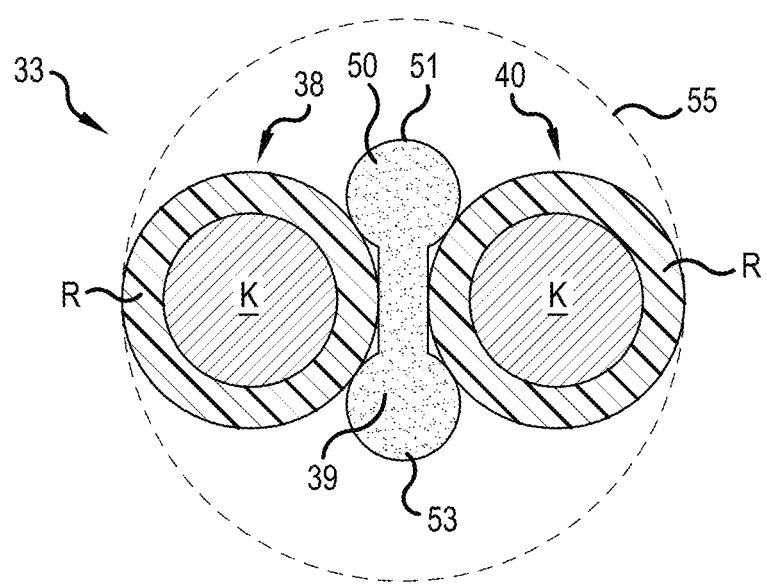
FIG. 4 is a close-up cross sectional view of a twisted pair from FIG. 3.
Figure 6:
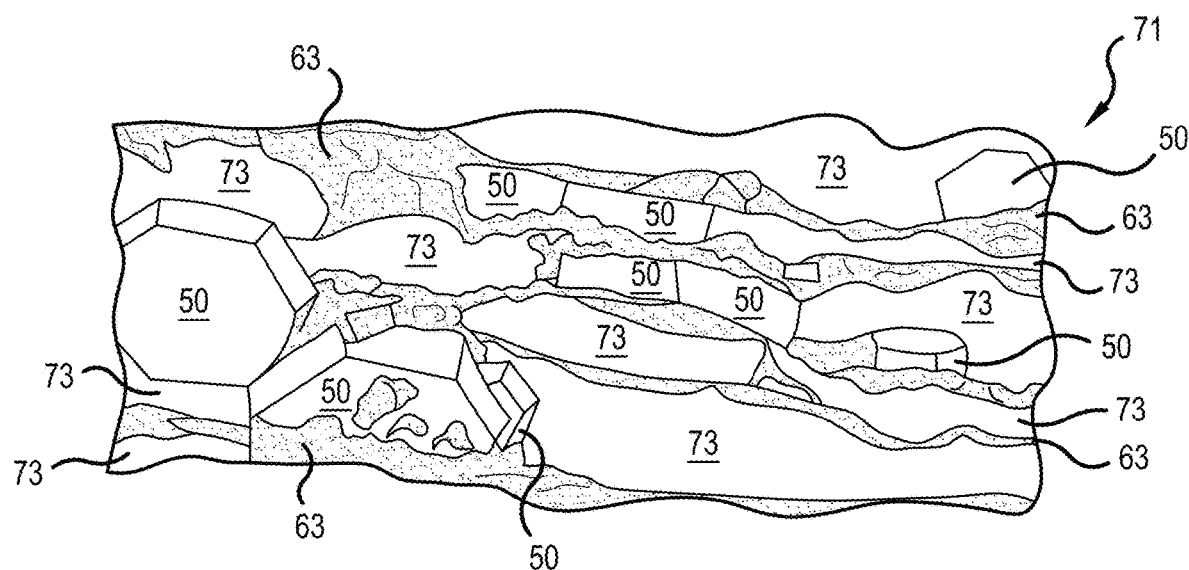
FIG. 6 is a close-up view of a dielectric material in accordance with the present invention.

In accordance, with a first embodiment of the present invention, the separator 37 and the first through fourth dielectric tapes 39, 42, 45 and 48, each include embedded strength members 50, also seen in the cross section of FIG. 3, and best seen in the close up views of FIGS. 4 and 6. In one embodiment, the strength members 50 may be formed of aluminum tri-hydrate (ATH) and talc. However, other materials are also suitable, like magnesium hydroxide, glass beads, or any other mineral filler or material which is non-flammable and will not stretch. As also illustrated in FIG. 2, the entire core of the cable 31 may have a core strand or twist in the direction of arrow 57, which may be opposite to the twist directions of the first, second, third and fourth twisted pairs 33, 34, 35 and 36.

FIG. 4 is a close-up view of the first twisted pair 33, which is similarly constructed although not identically constructed to the second, third and fourth twisted pairs 34, 35 and 36. Each of the first through eighth insulated conductors 38, 40, 41, 43, 44, 46, 47 and 49 is formed by a conductor K surrounded by a layer of dielectric insulating material R, such as a polymer or foamed polymer, common to the cabling art like fluorinated ethylene propylene (FEP), polyethylene (PE), polypropylene (PP) or the inventive material described hereinafter. Further, the insulating material R may be formed by an enamel coating, or another nonconductive coating from a diverse art like motor armature windings. The conductor K may be solid or stranded, and may be formed of a conductive metal or alloy, such as copper. In one embodiment, the conductor K is a solid, copper wire of about twenty three gauge size.

In one embodiment, the insulating material R may have a radial thickness of about seven mils or less, more preferably about five mils or less. This radial thickness of the insulating layer R is at least 20% less than the standard insulation layer thickness of a conductor in a typical equivalent twisted pair wire, more preferably at least 25% to 30% less. Typically, such a thin insulation layer R would not be possible due to the incorrect impedance obtained when the conductors K of the first and second insulated conductors 38 and 40 become so closely spaced during the twisting operation due to the thinner insulating layers R. Typically, such thin insulation layers were not practiced in the background art, because there was no appreciation of a solution to the mechanical and performance problems. However, the interposed first dielectric tape 39 eases the mechanical stresses during twisting so that the thinner insulating layer R is undamaged and also spaces the conductors K apart so that a proper impedance may be obtained, e.g., one hundred ohms.

As best seen in FIG. 4, the first dielectric tape 39 has a first width which extends approximately perpendicular to an extension length of the first dielectric tape 39 from a first edge 51 of the first dielectric tape 39 to an opposing second edge 53 of the first dielectric tape 39. The first width is less than a diameter of the first insulated conductor 38 plus a diameter of the second insulated conductor 40 plus a thickness of the first dielectric tape 39, wherein the thickness is measured by the spacing created between the first and second insulated conductors 38 and 40. A typical spacing might be between four to twelve mils, such as about eight mils or about ten mils. By this arrangement, the twists of the first twisted pair 33 occupy a space within the dashed line 55, which is circumscribed by the helical twisting of the first and second insulated conductors 38 and 40. In this arrangement, the first through eighth insulated conductors 38, 40, 41, 43, 44, 46, 47 and 49 may contact each other if adjacent and also may contact the inner wall of the jacket 32. In FIG. 4, the dielectric tape 39 is formed as a single unitary structure (e.g., the dielectric tape does not include multiple pieces attached together or layered).

Figure 5:
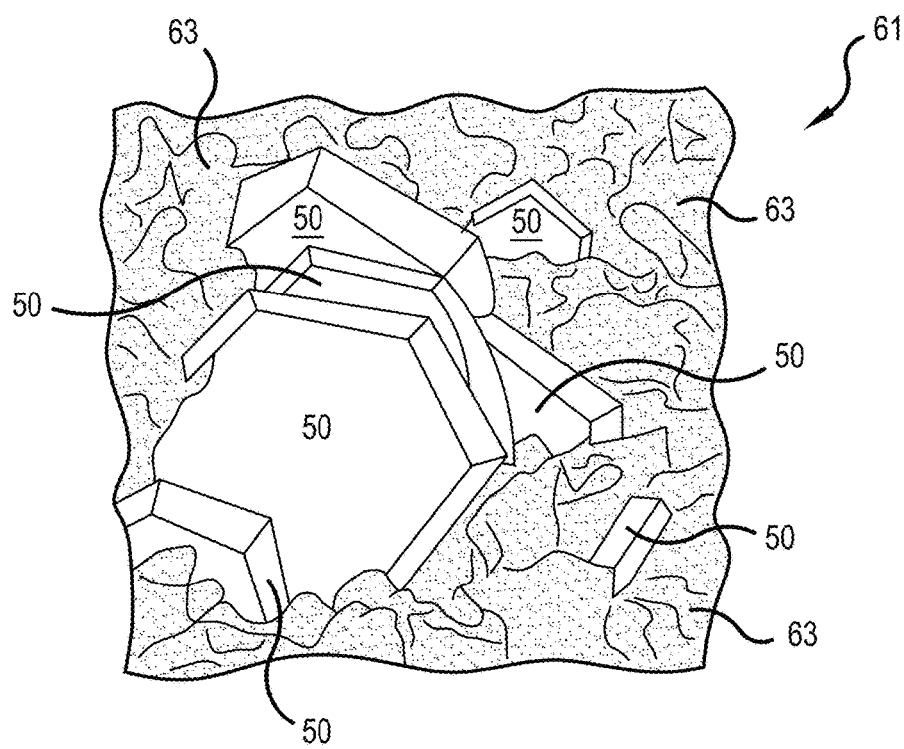
FIG. 5 is a close up view of a dielectric material used for elements 3 and 7 in FIG. 1.

FIG. 5 is a close up cross sectional view of a dielectric material 61 formed in accordance with the background art. The dielectric material 61 may be part of the plus-shaped separator 3 of FIG. 1 or the dielectric tape 7 of FIG. 1. The dielectric material 61 includes strength members 50, such as aluminum tri-hydrate (ATH) and talc. The strength members 50 are embedded within a dielectric base 63, which is formed of a material like polypropylene, polyethylene, PVC, PVDF, EVA, EAA, FEP, or any other type of thermal plastics. It is important to note the "tightness" of the embedding of the strength materials 50 within the dielectric base 63.

FIG. 6 is a close up cross sectional view of a dielectric material 71 formed in accordance with the present invention. The dielectric material 71 may be used to form an improved plus-shaped separator 3' or improved tapes 7' for use in FIG. 1, the tape-shaped separator 37 of FIG. 2 and/or the dielectric tapes 39, 42, 45 and 48 in FIG. 2. It is important to note the "open" voids 73 adjacent to the strength members 50 within the dielectric base 63, which often at least partially include the strength members 50 and/or abut the strength members 50.

Figure 7:
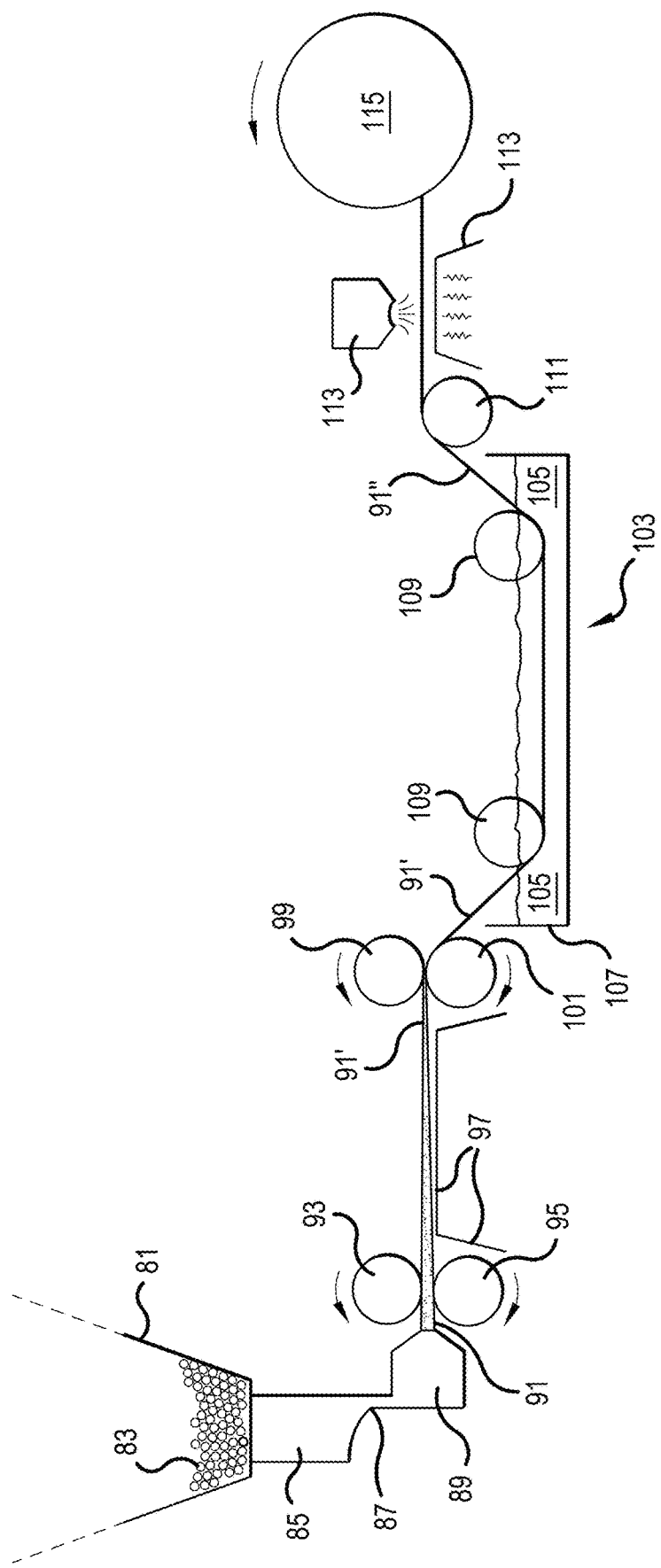
FIG. 7 is a block diagram of a machine for producing the dielectric material of FIG. 6.

Now, with reference to FIGS. 7 and 8, a machine for manufacturing and a method of manufacturing the dielectric material 71 will be described. In FIG. 7, a hopper 81 holds a plurality of beads 83. The beads 83 may be formed of the dielectric material 61 of FIG. 5. In other words, the beads 83 are formed of the dielectric base 53 with embedded strength members 50.

The hopper 81 feeds the beads 83 to a heating device 85, which turns the beads 83 into a flowing slurry and passes the slurry to a passageway 87. The passageway 87 feeds the slurry to an extrusion machine 89. The extrusion machine 89 extrudes a sheet of material 91.

The sheet of material 91 is engaged by a first pair of upper and lower driven rollers 93 and 95 which cause the sheet of material to move in a direction from the left side of FIG. 7 toward the right side of FIG. 7. The sheet of material 91 passes over a guide floor 97.

Next, the sheet of material 91 is engaged by a second pair of upper and lower driven rollers 99 and 101, which also cause the sheet of material 91' to continue to move in the direction from the left side of FIG. 7 toward the right side of FIG. 7. The speed of rotation of the second pair of upper and lower driven rollers 99 and 101 is greater than the speed of rotation of the first pair of upper and lower driven rollers 93 and 95. The differential in rotation speeds places a tension on the sheet of material 91, 91'.

The tension causes the sheet of material 91 to stretch/elongate and become thinner as the sheet of material passes over the guide floor 97. As best seen in FIG. 7, the sheet of material 91 is much thinner near reference numeral 91', where it enters the second pair of upper and lower driven rollers 99 and 101. As the sheet of material 91, 91' is still hot from the operation of the heater 85 and extruder 89, the material can be stretched and made thinner more easily. By the time the sheet of material 91' reaches the second pair of upper and lower driven rollers 99 and 101, the vacuum voids 73 have been formed and the interior configuration resembles the cross section depicted in FIG. 6. Although a drive system with rollers operating at different speeds has been shown in FIG. 7, other systems and processes may be used to stretch the sheet of material 91, 91'.

Next, the sheet of material 91' enters a cooling water bath 103. The cooling water bath 103 may include water 105 in a container 107, wherein the water 105 may be circulated through a chiller and filter and replenished as needed. One or more idler rollers 109 may reside within the cooling water bath 103. The cooling water bath 103 stabilizes the interior configuration of the sheet of material 91', as the walls of dielectric base 63, which surround the vacuum voids 73, become hardened and are not prone to collapse and/or shrinkage.

The cooled sheet of material 91" leaves the water 105 and passes over one or more idler or driven rollers 111. Additional drying steps may be applied to the cooled sheet of material 91" by supplemental heaters 113. Eventually, the sheet of material 91" is fed to a large reel 115, which is driven to roll up the sheet of material. If the sheet of material 91" is too wide for its eventual use in the cable core, with the width being defined as the dimension taken perpendicular to the plane of FIG. 7, then the sheet of material 91" can be cut into several tapes of smaller width after the supplemental heaters 113. The cutting may take place using blades, and the separate tapes may then be rolled up onto several different large reels 115, 115A, 115B, etc.

Figure 8:
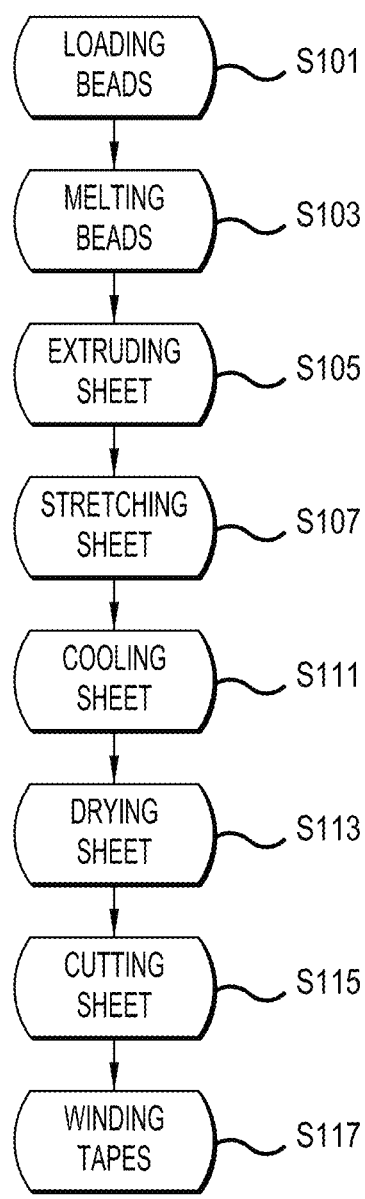
FIG. 8 is a flow chart illustrating a method for producing the dielectric material of FIG. 6.

FIG. 8 is a flow chart depicting the method for forming the dielectric material 71 as shown in FIG. 6. In step S101, beads 83 are fed into the hopper 81. The beads 83 are formed of a dielectric base 63 with embedded strength members 50.

In step S103, the beads 83 are heated by the heater 85 to form a slurry. In step S105, the slurry is extruded by the extruder 89 into a run of material. The run of material may take the shape of a sheet of material 91 or any other shape, such as a plus-shaped or star-shaped separator. In step S107, the run of material is stretched. Stretching the extruded run of material causes vacuum voids 73 within the extruded slurry.

Next in step S111, the stretched run of material is cooled. Cooling the stretched run of material causes the walls supporting the vacuum voids 73 to cure and stabilize. Once stabilized, the run of materials may optionally be further dried in step S113. The dried run of material, e.g., sheet of material 91", may then be optionally cut into suitable widths for a cable core element in step S115. Lastly, in step S117, the cable core element may be taken up, e.g., wound up, on a large reel 115 for use in cable manufacturing equipment.

As also discussed in the Summary of the Invention section above, the vacuum voids 73 within the dielectric material 71, best seen in FIG. 6, are particularly useful. When the dielectric material 71 is used to form a cable element that element has a lower dielectric constant, as compared to the same cable element without the vacuum voids 73. Testing by the Applicant confirmed about a 30% reduction in the dielectric constant. In other words, the stretched sample with vacuum voids 73, e.g., FIG. 6, has about a 30% reduction in its dielectric constant as compared to the unstretched sample, e.g., FIG. 5. For example, samples of the unstretched dielectric material had dielectric constants of about 1.00 and 1.06. Samples of the stretched dielectric material had dielectric constants of about 0.69 and 0.73.

The density of the material is also reduced by about 50% during the stretching operation, i.e., the same volume of material weighs about half. Also in samples tested, the yield strength went from about 2.8 lbs up to about 9 lbs. In other words, the unstretched tape (FIG. 5) starts to yield/elongate at 2.8 lbs, and the stretched tape (FIG. 6) starts to yield/elongate at about 9 lbs.

The extent of the stretching in step S107 needed to achieve the benefits of the invention has been studied. The phenomenon begins with even a 1% elongation, as density begins to drop and strength begins to increase. However, useful strength improvements seem to result when the material is elongated or stretched by at least 10% or more, such as at least 15% or more, like a 20% elongation.

It is also appreciated that the cable element, per unit length, is made lighter in weight. There is a reduced amount of material available to burn, which also reduces the amount of smoke in the case of a fire. Also, all of these advantages are obtained while eliminating any foaming agents normally needed to produce gas or air bubbles within a material.

Figure 9:
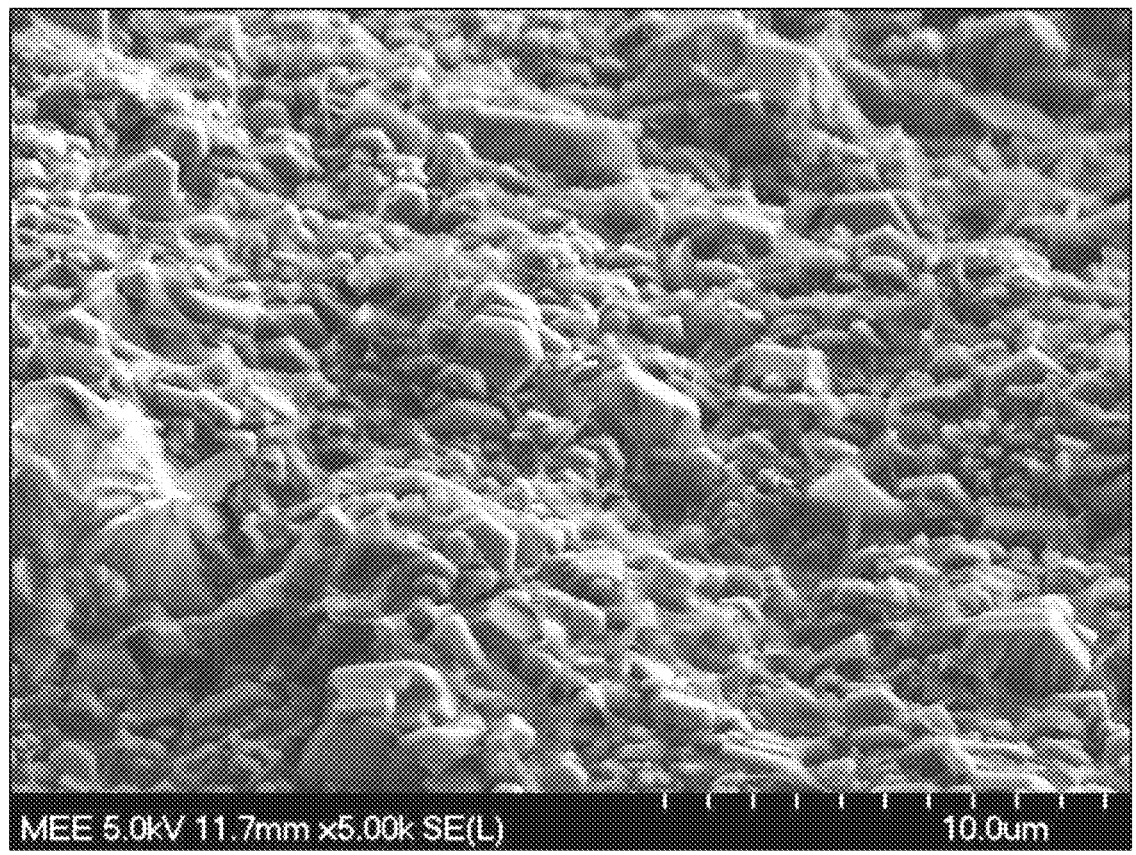
FIG. 9 is a close up photo of the dielectric material of FIG. 5 at a 5,000× magnification.
Figure 10:
FIG. 10 is a close up photo of the dielectric material of FIG. 6 at a 5,000× magnification.

FIG. 9 is an actual photograph taken of a surface of the dielectric material 61 of FIG. 5, in accordance with the background art. The photograph was taken at a multiplication power of 5,000×. Note the "tightness" of the strength members 50 within the dielectric base 63. FIG. 10 is a photograph taken of a surface of the dielectric material 71 of FIG. 6, in accordance with the present invention. The photograph was also taken at a multiplication power of 5,000×. Note the voids formed around and/or adjacent to the strength members 50 within the dielectric base 63. On the surface of the dielectric material 71, the voids are filled with air, whereas in the interior portions of the dielectric material 71, the voids would be vacuum voids 73 unless a passageway lead to the exterior of the dielectric material 71 to allow exterior air to enter the void created during the stretching operation S107.

Figure 11:
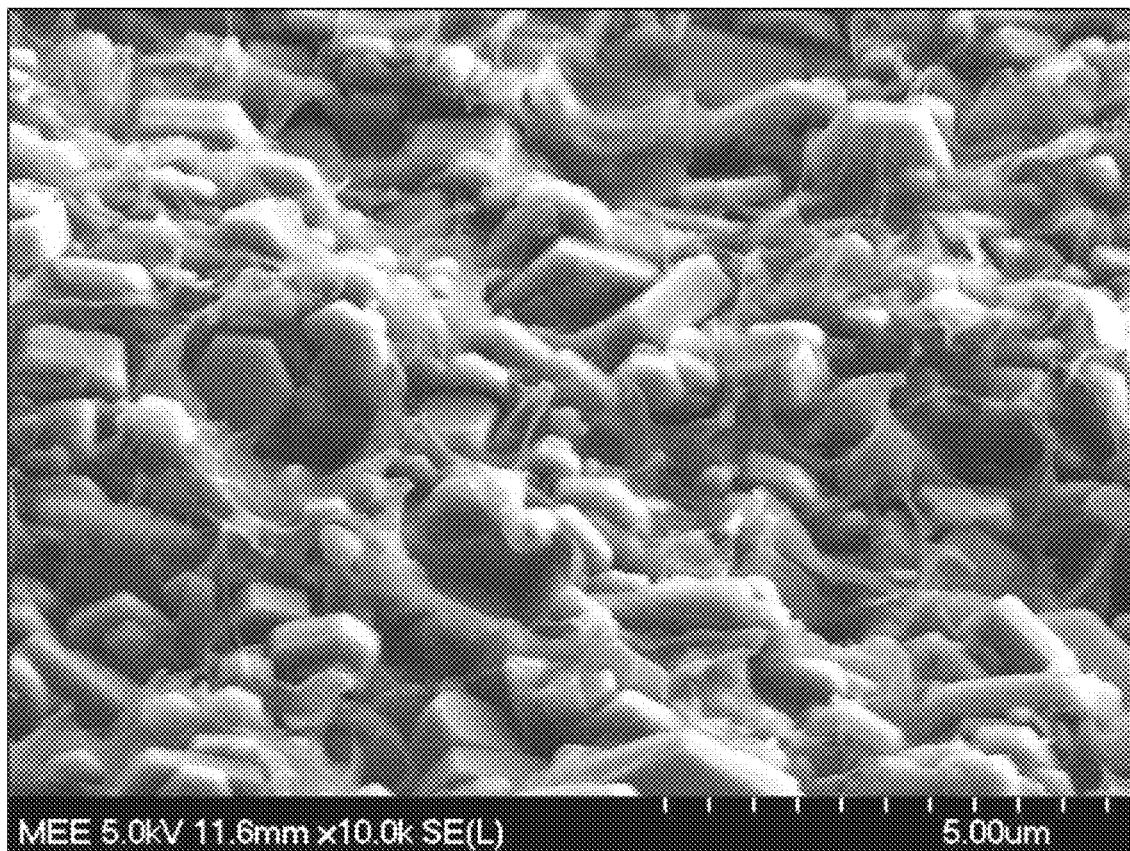
FIG. 11 is a close up photo of the dielectric material of FIG. 5 at a 10,000× magnification.
Figure 12:
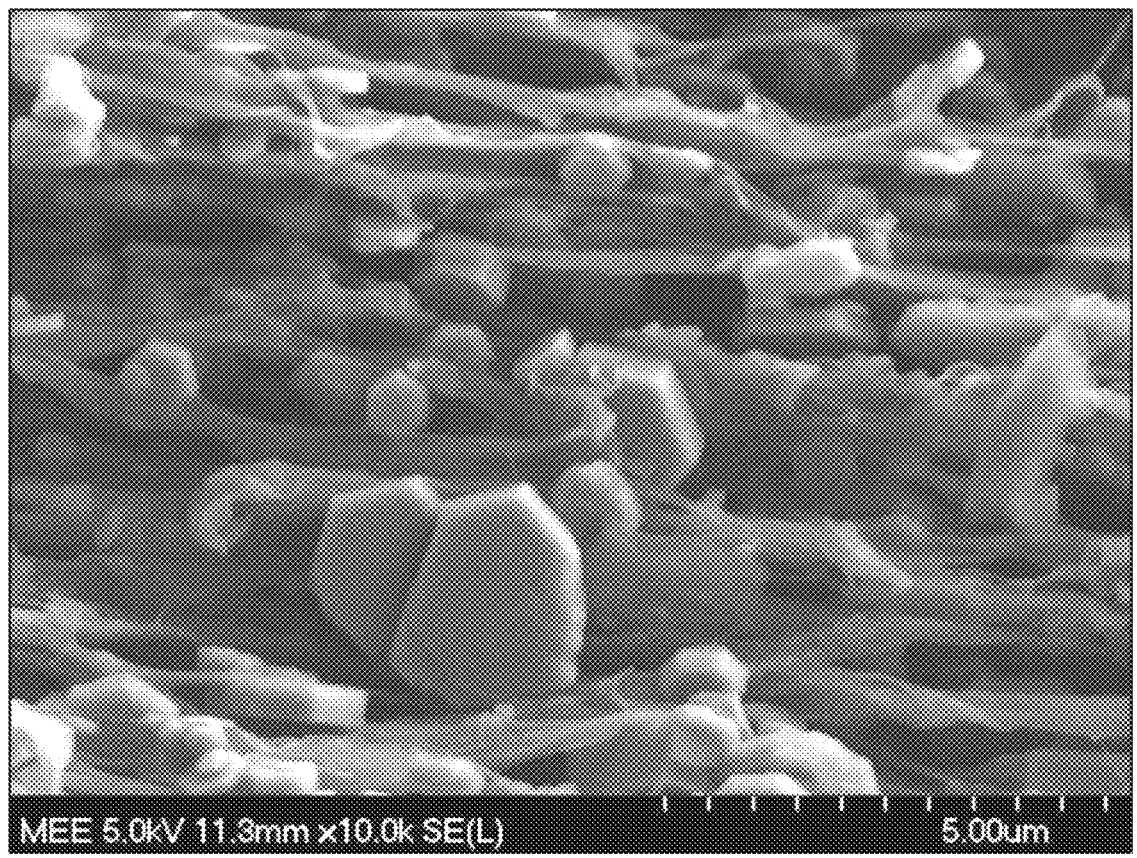
FIG. 12 is a close up photo of the dielectric material of FIG. 6 at a 10,000× magnification.
Figure 13:
FIG. 13 is a close up photo of the dielectric material of FIG. 5 at a 15,000× magnification.
Figure 14:
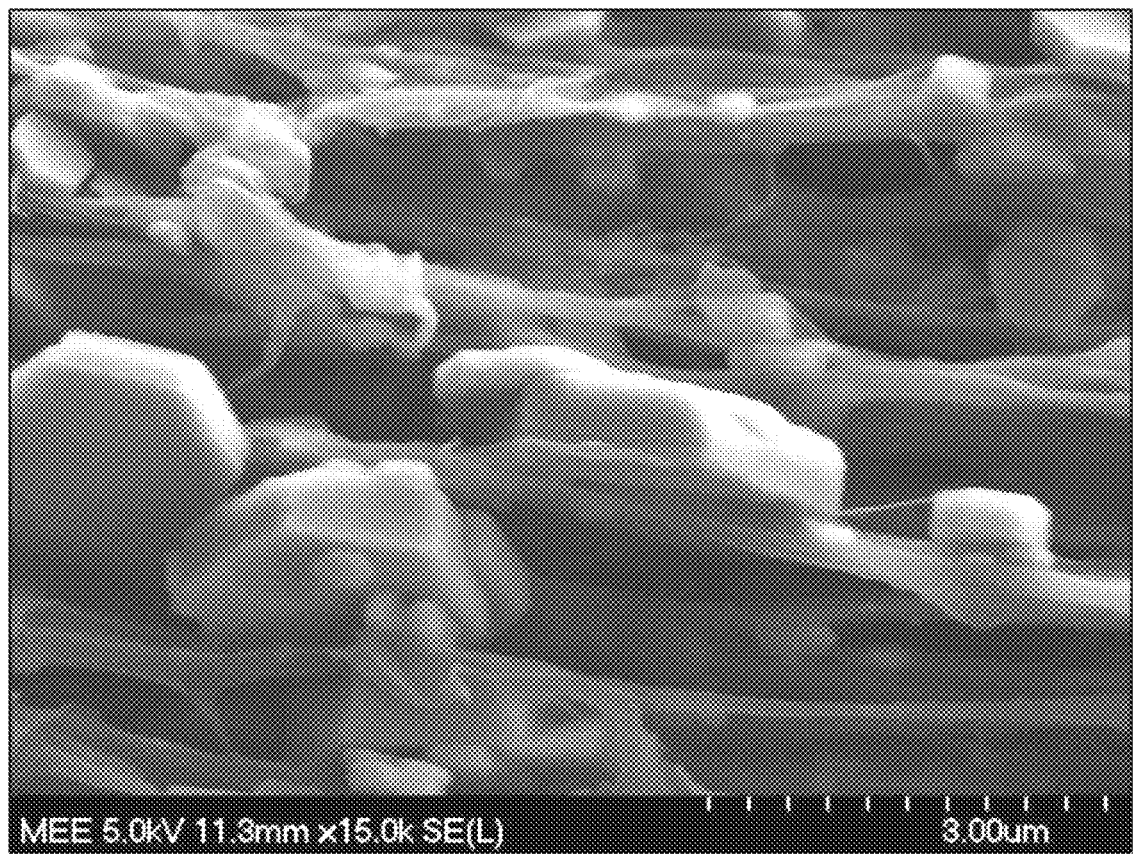
FIG. 14 is a close up photo of the dielectric material of FIG. 6 at a 15,000× magnification.

For more close up views, FIG. 11 is a photograph taken of the surface of the dielectric material 61 of FIG. 5, in accordance with the background art. The photograph was taken at a multiplication power of 10,000×. FIG. 12 is a photograph taken of the surface of the dielectric material 71 of FIG. 6, in accordance with the present invention. The photograph was also taken at a multiplication power of 10,000×. FIG. 13 is a photograph taken of the surface of the dielectric material 61 of FIG. 5, in accordance with the background art. The photograph was taken at a multiplication power of 15,000×. FIG. 14 is a photograph taken of the surface of the dielectric material 71 of FIG. 6, in accordance with the present invention. The photograph was also taken at a multiplication power of 15,000×.

Figure 15:
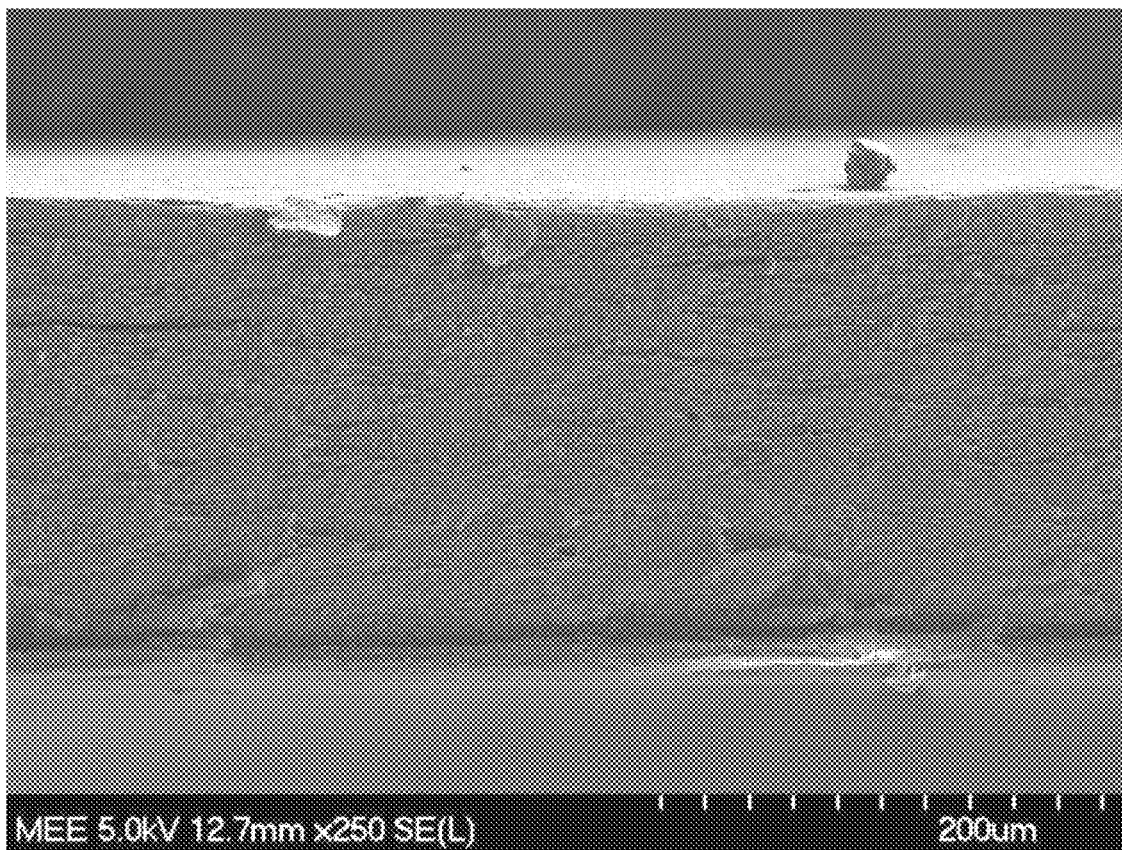
FIG. 15 is a close up side view photo of a dielectric tape formed of the dielectric material of FIG. 6 at a 250× magnification.
Figure 16:
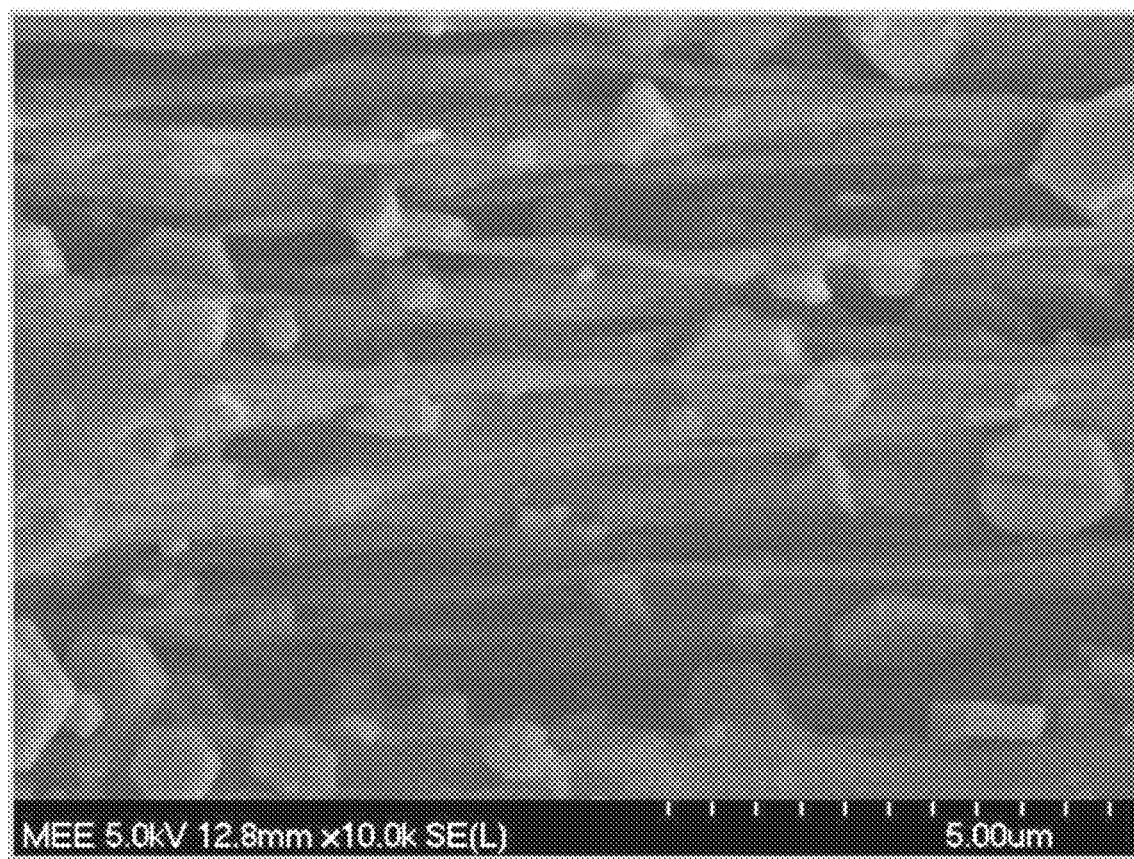
FIG. 16 is a close up side view photo of a dielectric tape formed of the dielectric material of FIG. 6 at a 10,000× magnification.

FIG. 15 is a side view of a tape formed in accordance with the present invention. The photograph was taken at a multiplication power of 250×. FIG. 16 is a side view of the tape formed in accordance with the present invention. The photograph was taken at a multiplication power of 10,000×. Although the tape has been cut by a blade during the manufacturing process in step S115, the presence of exterior voids 73 is still clearly evident in FIG. 16.

Figure 17:
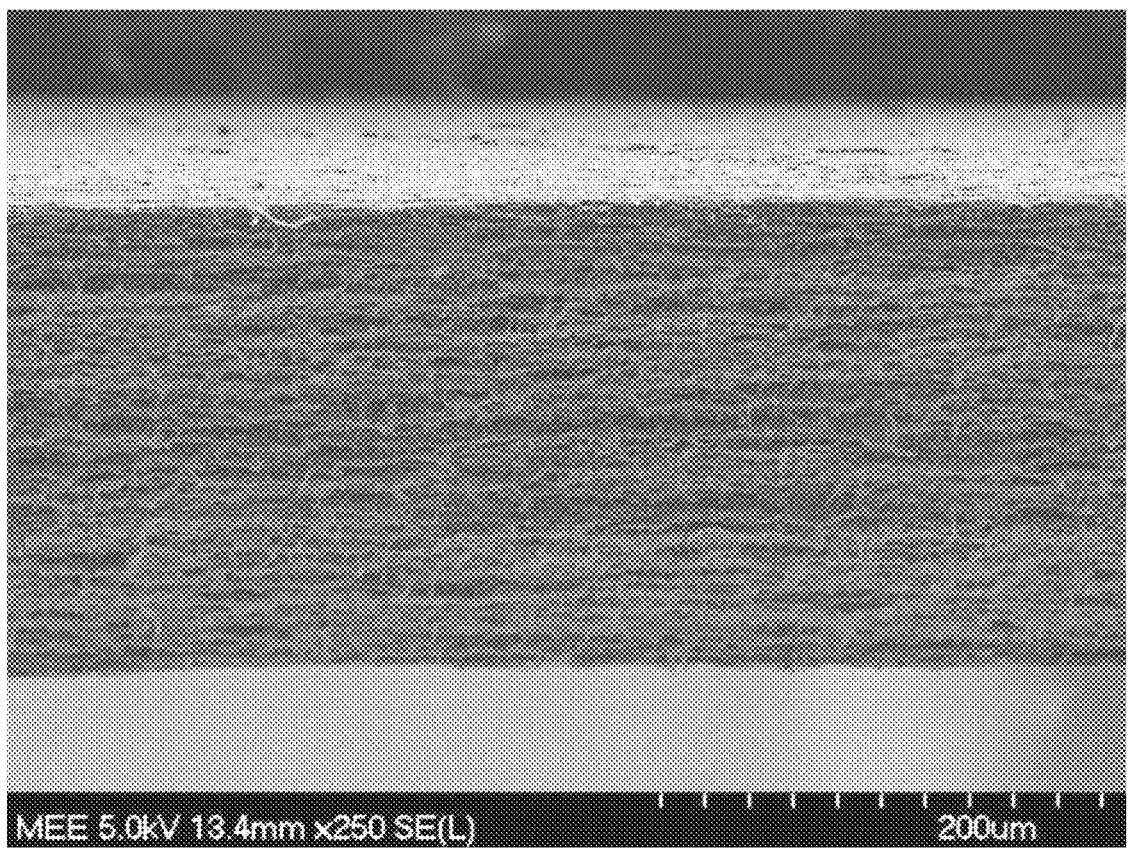
FIG. 17 is a close up cross sectional view photo of the dielectric tape formed of the dielectric material of FIG. 6 at a 250× magnification.
Figure 18:
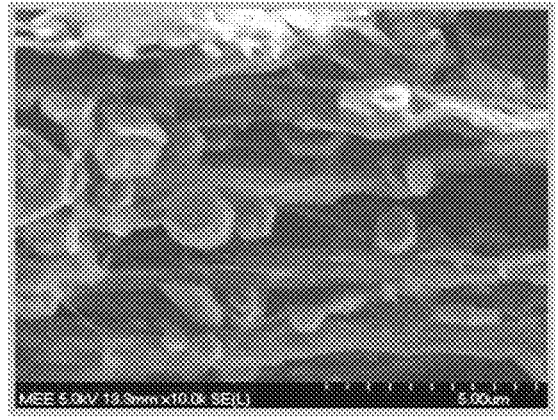
FIGS. 18-22 are close up cross sectional view photos of the dielectric tape formed of the dielectric material of FIG. 6 at a 10,000× magnification.
Figure 19:
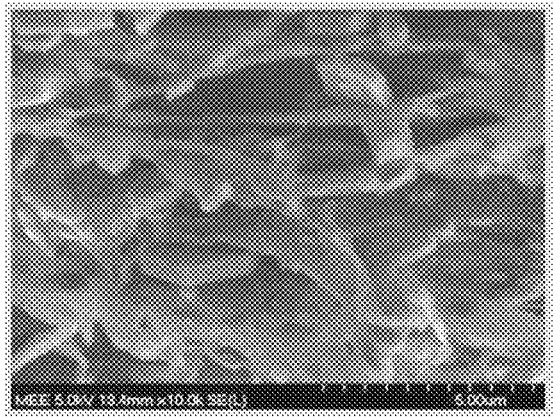
Figure 20:
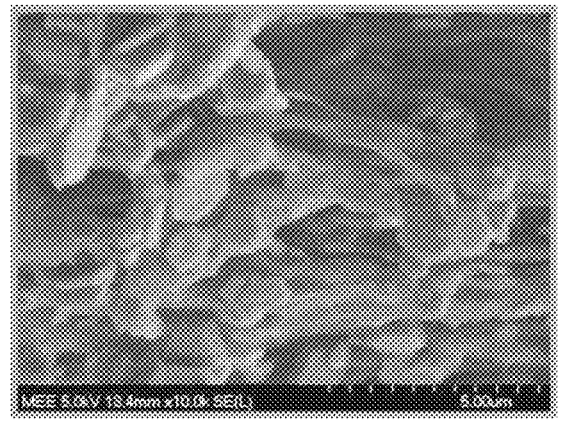
Figure 21:
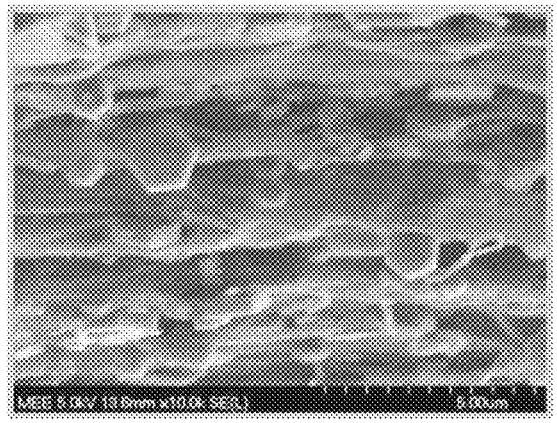
Figure 22:
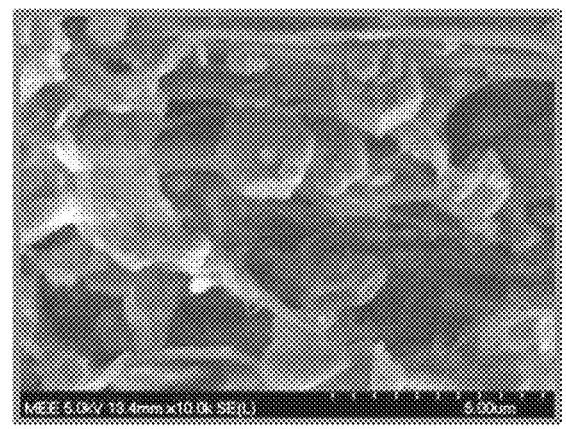

FIG. 17 is a cross sectional view of a tape formed in accordance with the present invention. The photograph was taken at a multiplication power of 250×. To produce the cross section, the tape was frozen and then snapped into two pieces. The photo of FIG. 17 shows the interior portion of the tape along the break line of the tape.

FIGS. 18-22 are close up views of various areas visible within the photo of FIG. 17. The photos of FIGS. 18-22 were taken at a multiplication power of 10,000×. Each of the photos in FIGS. 18-22 illustrates the vacuum voids 72 formed within the dielectric material 71. Further, the photos illustrate how the vacuum voids 73 at least partially surround or abut to the strength members 50. It is believed that the stretching process S107 causes relative movement between the dielectric base 63 and the strength members 50, which causes the strength members 50 to tear openings, e.g., pathways, within the dielectric base 63. As air is not present within the interior of the dielectric base 63, the openings, e.g., pathways, are formed as vacuum voids 73. The vacuum void 73 would tend to exert a force on its surrounding walls, tending to close the vacuum void 73, e.g., collapse the walls into each other. However, the modulus of the dielectric base 63 is sufficient to prevent or slow the closure of the vacuum void 73, and the modulus of the dielectric base 63 only increases during the cooling and drying steps S111 and S113, to stabilize the existence of the vacuum void 73.

Figure 23:
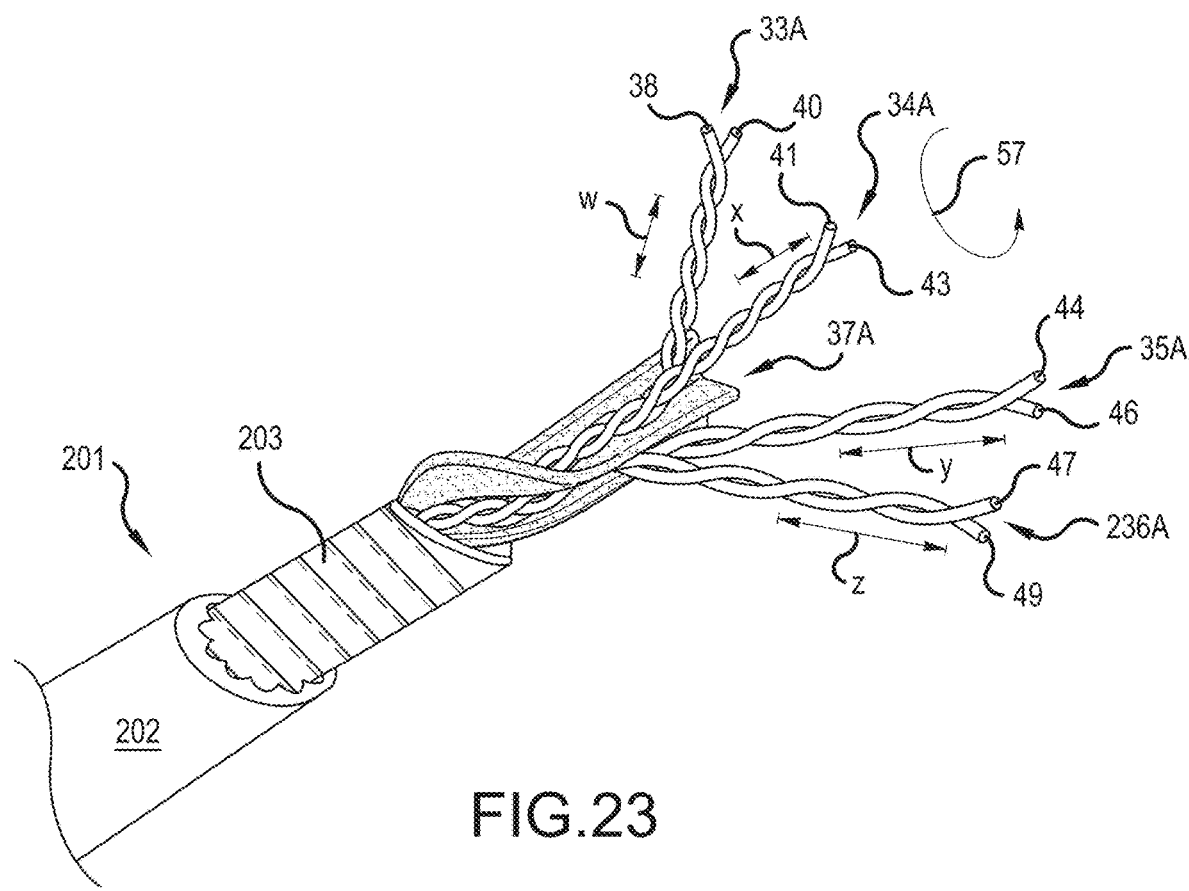
FIG. 23 is a perspective view of a twisted pair cable, in accordance with a second embodiment of the present invention.

Although, the cables illustrated in the drawing figures so far have included four twisted pairs, it should be appreciated that the present invention is not limited to cables having only four twisted pairs. Cables having other numbers of twisted pairs, such as one twisted pair, two twisted pairs or even twenty-five twisted pairs, could benefit from the structures disclosed in the present invention. Further, although the drawing figures have illustrated that each of the twisted pairs within the cable have a dielectric tape, it would be possible for less than all of the twisted pairs to have the dielectric tape. For example, the first through third twisted pairs could include a dielectric tape, while the fourth twisted pair could be formed without a dielectric tape. Further, although the drawing figures have illustrated an unshielded cable, it is within the scope of the appended claims that the cable could include a shielding layer and/or a core wrap between the core of twisted pairs and the inner wall of the outermost jacket. Further, although some drawing figures have illustrated a jacket having a smooth inner wall, it is within the scope of the present invention that the inner wall of the jacket could include fins or projections (as illustrated in FIG. 23) for creating air pockets around the perimeter of the core of twisted pairs. Further, all embodiments of the present invention may include a separator (e.g., tape, isolator, flute, crossweb) or not include a separator.

FIG. 23 is a perspective view of a twisted pair cable 201 in accordance with a second embodiment of the present invention. The cable 201 includes a dielectric jacket 202 with twelve fins and twelve recesses. The jacket 202 surrounds a core wrap 203. The core wrap 203 may be formed of paper or a dielectric material. Also, the core wrap 203 may be replaced by a shielding layer if desired.

One distinction of the second embodiment is that the first, second, third and fourth twisted pairs 33A, 34A, 35A and 36A do not include the first, second, third and fourth dielectric tapes 39, 42, 45 and 48. Another distinction of the second embodiment is that the dielectric separator 37A has a star-shape or plus-shape, so as to separate each of the first, second, third and fourth twisted pairs 33, 34, 35 and 36 from the others of the first, second, third and fourth twisted pairs 33, 34, 35 and 36.

In the second embodiment, the separator 37A may be formed of the dielectric material 71 of FIG. 6. Further, other dielectric components of the cable 201 may be formed of the dielectric material 71 of FIG. 6, such as the cable jacket 202, the core wrap 203, and even the dielectric insulating material R surrounding the conductor K for each of the first through eighth insulated conductors 38, 40, 41, 43, 44, 46 47 and 49. The new dielectric material 71 can be used for any component with a communication cable, which is presently formed of a solid or foamed dielectric material.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A separator for a communications cable comprising:
   extruded dielectric material with plural members embedded therein; and
   vacuum voids formed within said extruded dielectric material, wherein said vacuum voids at least partially include or abut said plural members.

2. The separator according to claim 1, wherein said plural members are formed of nonflammable materials.

3. The separator according to claim 1, wherein said plural members include one or more materials selected from the group consisting of aluminum tri-hydrate (ATH), talc, magnesium hydroxide, and glass beads.

4. The separator according to claim 1, wherein said separator is formed as a flat tape.

5. The separator according to claim 1, wherein said separator is formed as a plus-shaped or star-shaped separator.

6. The separator according to claim 1, wherein said plural members are considered plural strength members.

7. A dielectric member for a communications cable formed by a process of:
   extruding a dielectric material with plural members embedded therein to form a sheet of material having a width and length;
   stretching the sheet of material to expand either or both of the length of the sheet of material and the width of the sheet of material; and
   causing vacuum voids to form within the sheet of material due to the stretching of the sheet of material.

8. The dielectric member according to claim 7, wherein said plural members include one or more materials selected to lower a dielectric constant of the dielectric member and to reduce smoke emitted in the event of a fire involving the dielectric member.

9. The dielectric member according to claim 7, wherein said plural members include nonflammable materials.

10. The dielectric member according to claim 7, wherein said plural members include one or more materials selected from the group consisting of aluminum tri-hydrate (ATH), talc, magnesium hydroxide, and glass beads.

11. The dielectric member according to claim 7, wherein said vacuum voids at least partially contain, or abut said plural members.

12. The dielectric member according to claim 7, and wherein stretching the sheet of material includes elongating either or both of the length of the sheet of material and the width of the sheet of material by at least 10%.

13. The dielectric member according to claim 7, further comprising:
   cutting the sheet of material to form tapes to be used as the dielectric member for a communication cable.

14. A method of forming a dielectric member for a communications cable, said method comprising:
   extruding a slurry of a dielectric base with embedded members therein into a run of material;
   stretching the run of material;
   producing vacuum voids within the stretched run of material; and
   cooling the stretched run of material.

15. The method of claim 14, further comprising:
   feeding beads including the dielectric base into a hopper; and
   melting the beads prior to said extruding, wherein the beads already include the members embedded therein prior to said melting.

16. The method of claim 14, wherein stretching the run of material includes elongating either or both of the length of the run of material and the width of the run of material by at least 10%.

17. The method of claim 14, wherein stretching the run of material includes elongating either or both of the length of the run of material and the width of the run of material by at least 15%.

18. The method of claim 14, wherein stretching the run of material continues until a density of the dielectric base with embedded members is reduced by about 50% due to the creation of the vacuum voids, as compared to the unstretched run of material.

19. The method of claim 14, wherein stretching the run of material continues until a dielectric constant of the dielectric base with embedded members is reduced by about 30% due to the creation of the vacuum voids, as compared to the unstretched run of material.

20. The method of claim 14, wherein stretching the run of material continues until a tensile strength of the dielectric base with embedded members is increased by at least 200%, as compared to the unstretched run of material.

* * * * *